United States Patent [19]

Tsay

[11] Patent Number: 4,932,488
[45] Date of Patent: Jun. 12, 1990

[54] ELECTRONIC WEIGHING APPARATUS HAVING A CONVEYOR MOUNTED THEREIN FOR WEIGHING AND CONVEYING A PLURALITY OF ARTICLES

[76] Inventor: Yeong-Long Tsay, No. 388, cheng-Kung Rd., Chung-Chu, Taichung City, Taiwan

[21] Appl. No.: 413,445
[22] Filed: Sep. 27, 1989
[51] Int. Cl.⁵ .................. G01G 19/00; G01G 21/28
[52] U.S. Cl. .................................... 177/145; 177/238
[58] Field of Search .............. 177/145, 238, 243, 180

[56] References Cited

U.S. PATENT DOCUMENTS

| | | | |
|---|---|---|---|
| 4,023,668 | 5/1977 | De Santo | 177/145 X |
| 4,440,249 | 4/1984 | Del Rosso | 177/145 |
| 4,564,077 | 1/1986 | Del Rosso | 177/145 |
| 4,570,729 | 2/1986 | Del Rosso | 177/145 |
| 4,719,980 | 1/1988 | Knothe et al. | 177/238 X |

Primary Examiner—George H. Miller, Jr.
Attorney, Agent, or Firm—Marshall & Melhorn

[57] ABSTRACT

An electronic weighing apparatus includes a housing; a central opening formed in the upper face of the housing; a load cell instaled in the housing for detecting the weight of an article; and a scale pan which is made of an insullated material and mounted on the load cell under the central opening of the housing so that the article to be weighed can be placed on the scale pan for weighing purposes. A power-driven conveyor is mounted to the scale pan near the central opening of the housing so that articles to be weighed can be quickly weighed on the power-driven conveyor when conveyed over the central opening by means of the power-driven conveyor.

3 Claims, 3 Drawing Sheets

ELECTRONIC WEIGHING APPARATUS HAVING A CONVEYOR MOUNTED THEREIN FOR WEIGHING AND CONVEYING A PLURALITY OF ARTICLES

BACKGROUND OF THE INVENTION

This invention relates to an electronic weighing apparatus, more particularly to an electronic weighing apparatus having a conveyor mounted therein so as to continuously weigh and convey a plurality of articles.

Conventionally, electronic weighing apparatuses are widely used for weighing articles. In operation, said article is manually placed on a scale pan which is mounted on a load cell, which is used to detect the weight of said article, and then manually removed from the scale pan. If there are numerous articles to be weighed for quality control purposes, the placing and removing of the articles during the weighing operation is time-consuming and inefficient.

SUMMARY OF THE INVENTION

It is therefore a main object of this invention to provide an electronic weighing apparatus of the abovementioned type having a power-driven conveyor mounted to the scale pan so as to continuously weigh and convey a plurality of articles quickly and efficiently.

Accordingly, with the present invention, an electronic weighing apparatus of the type described in this application comprises a housing having a flat upper face in which a central opening is formed; a load cell installed in the housing for detecting the weight of the article being weighed; means for zeroing and calibrating the electronic weighing apparatus and displaying the weight of the article to be weighed which has been detected by the load cell; and a scale pan which is made of an insulated material and is mounted on the load cell under the central opening of the housing so that the article being weighed can be placed on the scale pan for weighing purposes. A power-driven conveyor is mounted to the scale pan near the central opening of the housing so that an article can be quickly weighed on the power-driven conveyor when the article is conveyed over the central opening by means of the power-driven conveyor.

BRIEF DESCRIPTION OF THE DRAWINGS

Other features and advantages of this invention will become apparent in the following detailed description of a preferred embodiment of this invention with reference to the accompanying drawings, in which.

DETAILED DESCRIPTION OF THE PREFERRED EMBODIMENT

Figure 1:
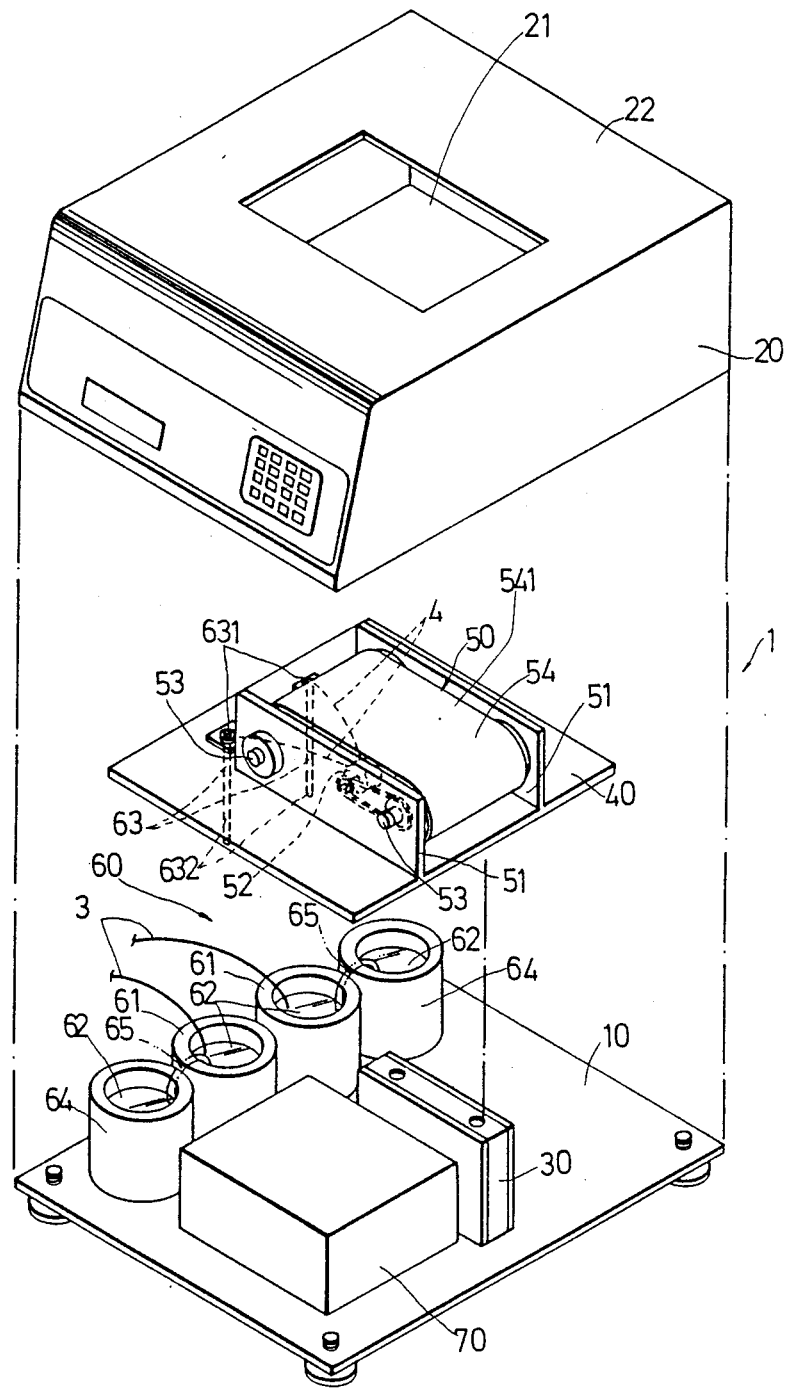
FIG. 1 is a partially exploded perspective view of a preferred embodiment of an electronic weighing apparatus of this invention.
Figure 2:
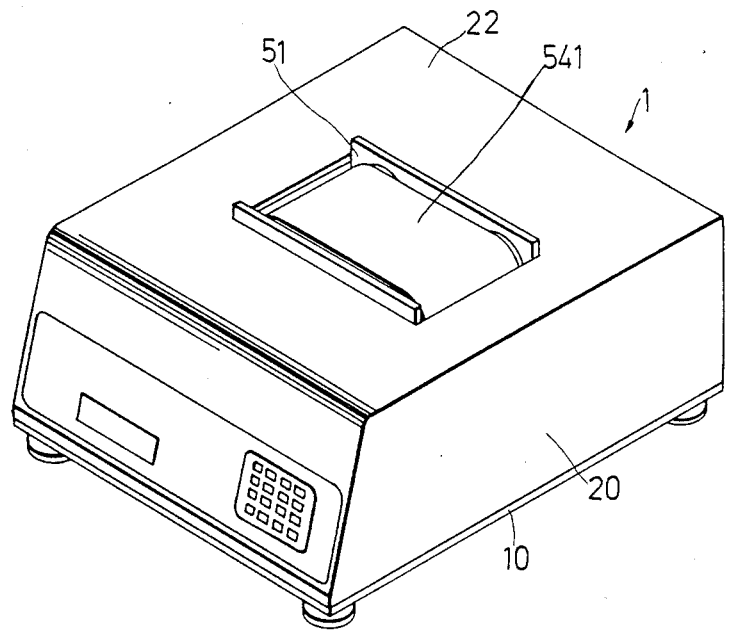
FIG. 2 is a perspective view of a preferred embodiment of an electronic weighing apparatus of this invention.

Referring to FIGS. 1, 2, a preferred embodiment of an electronic weighing apparatus of this invention is shown. The electronic weighing apparatus includes a generally rectangular housing 1 consisting of a flat seat 10 and a rectangular cap 20. A rectangular central opening 21 is formed in the top face 22 of the cap 20. A load cell 30 for detecting the weight of an article and a means for zeroing and calibrating the electronic weighing apparatus and displaying the weight of the article being weighed 70, are installed in the housing 1 and function in a conventional way. A flat plastic scale pan 40 is mounted on the load cell 30 under the central opening 21 of the cap 20 for the loading of the articles to be weighed. All of the abovementioned parts of the electronic weighing apparatus are operated and arranged in a conventional way, well known by those skilled in the art.

Two opposed mounting plates 51 parallelly extend from the upper face of the scale pan 50 and protrude out from the central opening 21. A belt conveyor 50 is mounted to the scale pan 40 near the central opening 21 of the cap 20. The belt conveyor 50 includes two rollers 53 transversely and rotatably mounted between the mounting plates 51 and a conveyor belt 54 stretched between, so as to move over, said rollers 53. The conveyor belt 54 is arranged so that the upper face 541 of the conveyor belt 54 protrudes slightly above the top face 22 of the cap 20 of the housing 1, as best illustrated in FIG. 2. A motor 52 is mounted to the scale pan 40 between the two mounting plates 51 so as to drive the two rollers 53 to rotate.

Figure 3:
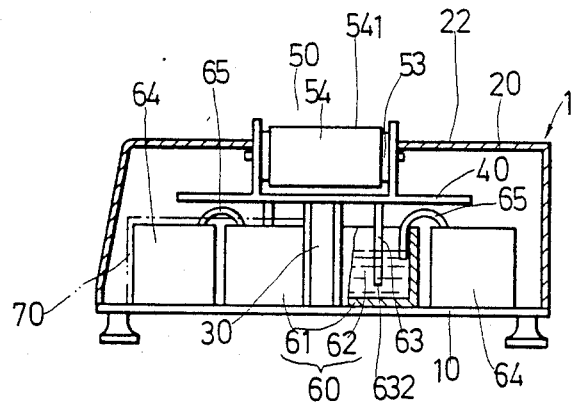
FIG. 3 is a partially broken away, sectional view, of the electronic weighing apparatus of FIG. 2 according to this invention.

Referring to FIGS. 1, 3, a connection device 60 is provided for connecting the motor 52 to a power source (not shown). The connection device 60 includes a first pair of wires 4, a second pair of wires 3, two metal rods 63, (such as zinc rods or copper rods), and two first insulated containers 61. The first insulated containers are filled with a conductive fluid 62, (such as salt water), and fixed to the seat 10 of the housing 1. Each of the metal rods 63 is suspended in the conductive fluid 62 of one of the first insulated containers 61 at one end thereof 632, as illustrated in FIG. 3, and connected to the scale pan 40 at the other end thereof 631. The first pair of wires 4 are respectively interconnected between the motor 52 and the ends 631 of the metal rods 63 not suspended in the conductive fluid 62. Each of the second pair of wires 3 is dipped in the conductive fluid 62 of one of the first insulated containers 61 at one end thereof and connected to said power source at the other end thereof. Two second insulated containers 64 are positioned adjacent to the first insulated containers 61 and filled with said conductive fluid 62. Two siphons 65 are respectively communicated with the conductive fluid 62 contained in the first and second insulated containers 61, 64 so that said conductive fluid 62 in the second insulated containers 64 can be siphoned to the first insulated containers 61 when the volume of said conductive fluid 62 in the first insulated containers 61 is decreased due to electrolysis.

It is noted that the connection device 60 of this invention is a special arrangement which is different from a conventional connection accomplished merely by the use of wires. As proven by experiments conducted by the inventor, if a conventional connection using wires is used to connect the motor 52 to the power source, an additional load will be exerted onto the scale pan 40 causing an error of ±5 to 10 grams to be displayed. Since the metal rods 63 are suspended from the scale pan 40 so as to dip into the conductive fluid 62 contained in the first insulated containers, no additional load is exerted on the scale pan 40. In addition, because the allowable error of such an electronic weighing apparatus is 0.2 grams, the buoyancy of the metal rods 63 is relatively small and will insubstantially effect the weight readout of the electronic weighing apparatus. Furthermore, the effects of said buoyancy on the weigh readout can be eliminated by using the zeroing means 70.

Figure 4:
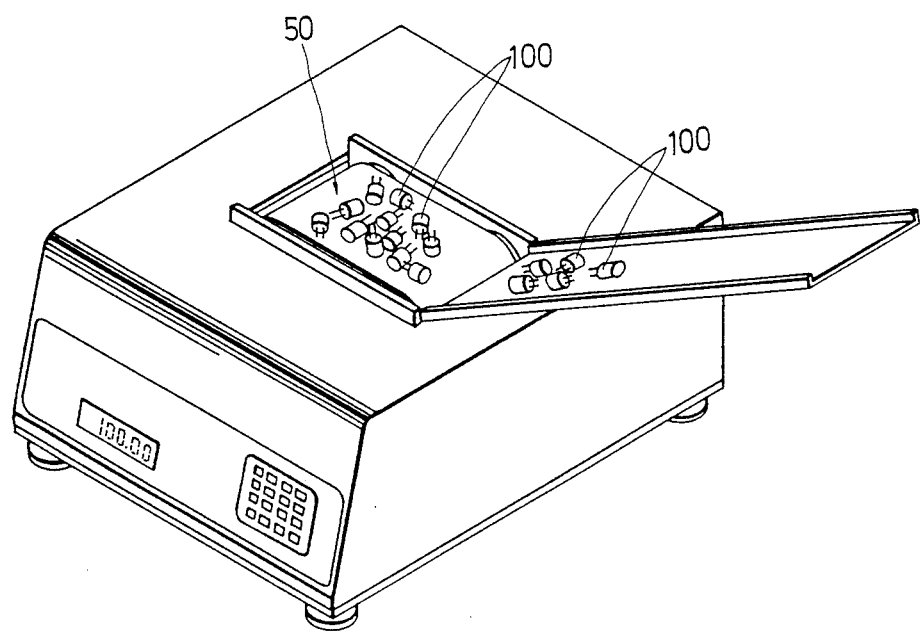
FIG. 4 is a perspective schematic view showing the electronic weighing apparatus of this invention in an operative position.

In operation, a plurality of articles 100 can be quickly weighed by passing over the belt conveyor 50, as illustrated in FIG. 4. In this way, weighing operations can be carried out efficiently.

With this invention thus explained, it is apparent that numerous modifications and variations can be made without departing from the scope and spirit of this invention. It is therefore intended that this invention be limited only as indicated in the appended claims.

I claim:

1. An electronic weighing apparatus comprising a housing having a flat upper face in which a central opening is formed; a load cell installed in said housing for detecting the weight of an article; means for zeroing and calibrating said electronic weighing apparatus and displaying the weight of said article being weighed which has been detected by said loaded cell; a scale pan which is made of an insulated material and is mounted on said load cell under said central opening of said housing so that articles to be weighed can be placed on said scale pan for weighing purposes; wherein the improvement is characterized in that a power-driven conveyor is mounted on said scale pan near said central opening of said housing so that an article can be weighed on said power-driven conveyor when said article is conveyed over said central opening by said power-driven conveyor.

2. An electronic weighing apparatus as claimed in claim 1 further comprising a motor for driving said power-driven conveyor and a connection device for connecting said motor to a power source, said connection device including two first insulated containers, having a conductive fluid contained therein, installed in said housing, two metal rods each of which is suspended in said conductive fluid of one of said first insulated containers at one end thereof and connected to said scale pan at the other end thereof, a first pair of wires interconnected between said motor and said ends of said metal rods which are connected to the scale pan, and a second pair of wires each of which is dipped in said conductive fluid of one of said first insulated containers at one end thereof and connected to said power source at the other end thereof.

3. An electronic weighing apparatus as claimed in claim 2 further comprising two second insulated containers filled with said conductive fluid which are positioned adjacent to said first insulated containers, and two siphons respectively communicated with said conductive fluid contained in said first and second insulated containers so that said conductive fluid in said second insulated containers can be siphoned to said first insulated containers when volume of said conductive fluid in said first insulated containers is decreased due to electrolysis.

* * * * *